United States Patent Office 3,158,991
Patented Dec. 1, 1964

3,158,991
IRRADIATED POLYMERIC PROPELLANTS AND PROCESS OF ROCKET PROPULSION
Gaetano F. D'Alelio, South Bend, Ind., assignor to Dal Mon Research Co., Cleveland, Ohio, a corporation of Delaware
No Drawing. Filed Apr. 24, 1958, Ser. No. 730,533
23 Claims. (Cl. 60—35.4)

This invention relates to irradiated, crosslinked polymeric compositions. More specifically, it relates to such compositions adapted for use as a solid propellant fuel.

In the propelling of rockets and related devices, it is highly desirable that the fuel supplying the propellant force should be a solid fuel. The use of liquid or gaseous fuels requires containers generally capable of withstanding considerable pressures, as well as devices for feeding the fuel, all of which add considerable weight to the rocket. Moreover, with the fuel in a liquid state, there is considerable sloshing in the container which causes shifting of weight and endangers directional control of the rocket. With solid fuels, however, the containing and feeding devices can be dispensed with or be simplified considerably and sloshing is avoided. In fact, the fuel can be used as its own container and as an insulating shield for the combustion zone.

The use of thermoplastic hydrocarbon resins for such purpose has the disadvantage that the portion of the resin in proximity to the flame or combustion zone is melted and either drips away or is blown away by the combustion gases. This results in a considerable loss of the B.t.u. value of the fuel.

It has been proposed to use thermoplastic rubber to give the fuel its desired shape and then, after the desired modifiers have been added, the rubber is vulcanized to remove the thermoplastic properties. However, vulcanization requires undesirable conditions, such as increased temperature, and the addition of undesirable vulcanizing agents. Moreover with such rubber compositions, there is undesirable channeling during the combustion.

In accordance with the present invention, it has now been found that solid propellant fuels can advantageously be made of thermoplastic rubber, either natural or any of the various synthetic types, which, with or without the addition or incorporation of modifiers, are irradiated to produce crosslinking of the polymeric materials and thereby impart non-dripping, non-melting properties to the fuel. The fuel is advantageously made in the form of a solid rod or elongated cylinder with an opening running along the axis of the rod in such a manner that an oxidizing agent or resulting combustion gases can be passed through the opening so that the rod is burned from the inside surfaces. The fuel composition also advantageously contains oxidizing agents of a solid or liquid type which will either sustain the combustion itself or at least will supplement the oxidizing action of the material being passed through the rod. Such materials as ammonium perchlorate, potassium perchlorate, ammonium nitrate, etc., can be used for this purpose.

In addition to natural rubber, various types of synthetic rubbers can be used, including those made by polymerization or copolymerization of 1,3-dienes by themselves, or in mixture with each other, or with other compounds such as styrene, various styrene derivatives, acrylonitrile, isobutylene, etc. Typical dienes used for this purpose include: butadiene, isoprene, chloroprene, 2-cyano-1,3-butadiene, 2,3-dimethylbutadiene, etc. The various kinds of rubbers used include the various types such as the butyl-rubber type, those made by the so-called cold rubber method, those made by the sodium catalyzed process, etc. Such rubber materials are sometimes generally referred to herein as fuel base materials, or base materials.

The rubber is used in its initial thermoplastic state so as to permit the incorporation of various modifiers, such as oxidizing agents, crosslinking modifiers, minor amounts of other materials, such as polymeric hydrocarbons, polymeric oxygenated hydrocarbons, paraffin, etc., and thereafter molded into the desired shape for irradiation and subsequent use.

While such materials can be used as such in this invention, it is generally advantageous to use a crosslinking modifier in these materials which will facilitate and increase molecular crosslinking. Thus, the amount of irradiation required to produce the desired effects in the material can generally be decreased. Moreover, temperature increases can thereby be more easily avoided or controlled.

The use of irradiation to produce the crosslinked character of these compositions and resultant infusibility therein, permits lower temperatures in the manufacturing process and avoids adverse effects on the various oxidizing agents which may be incorporated in the fuel. Since the crosslinking effected hereby does not require high temperatures, this invention permits the incorporation of high proportions of oxidizing agents that are unstable at temperatures normally used to effect crosslinking. Moreover, the material can be precooled and periodically recooled during preparation without adversely affecting the crosslinking operation. Moreover, the product of this invention when used as a rocket fuel does not result in channeling and serves as a good insulation shield for the combustion zone.

While other types can also be used, the crosslinking modifiers used in the practice of this invention advantageously can be polyalkenyl aryl compounds, i.e. divinyl benzene, diallyl naphthalene, diisopropenyl diphenyl, etc., polyunsaturated esters, ethers, mixed ether-esters, derivatives of alkenyl aryl hydrocarbons, etc., such as the diacrylate of hexamethylene glycol, the divinyl ester of adipic acid, the diallyl ester of azelaic acid, the vinyl ester of 11-acryloxy-undecylic acid, etc.

It is generally desirable that the fuel be molded in the shape in which it is ultimately to be used before the composition is irradiated. In fact, the fuel can be cast or molded as one entire unit which will comprise the entire fuel load for one rocket and can be substantially as long as the rocket if desired. Therefore, the size is limited only by the size of the rocket in which it is to be used.

It is possible to make the fuel in other shapes than indicated above and have the irradiated fuel machined to give the desired shape. For example, cylindrical shapes are generally desirable with an opening running through the cylinder along its linear axis. If desired there can be a plurality of such openings running through the length of the mass so that more than one oxidizing stream can function simultaneously. However, various other shapes can be used, such as blocks having rectangular or square cross sections with one or more openings running along the linear axis of the block.

While the aforementioned shapes are preferred, it is also possible to use smaller units or shapes made by the practice of this invention, and then to assemble them in a space or container in such a manner that one or more open linear paths are left through the assembled mass so that the oxidizing gas and/or the combustion gases can be passed therethrough. For example, the fuel can be in the shape of discs with an opening in the center, or in half or quarter discs, or even with rectangular, square, or various other cross-sections so that upon assembly, one or more openings for the oxidizing gas are formed through the assembled mass. Sometimes to accommodate the irradiation equipment a cylindrical mass can be made of a number of concentric cylinders for which the outer diameter of one is slightly less than the diameter of the inside linear opening of another so that the assembled cylindrical mass actually comprises a number of cylindrical sleeves which fit over one another. The axial opening of the one having the smallest diameter would be the linear axis opening of the assembled mass.

In any case, however, the desired modifiers are added before irradiation. For example, the auxiliary oxidizing agents, such as the ammonium and potassium perchlorates and nitrates, should be added before irradiation. These are desirably in fine particle size so as to permit substantially uniform distribution throughout the mass. The oxidizing composition which is to be passed through the center opening is of the type generally used presently, such as pure or highly concentrated oxygen. The upper limit in the amount of oxidizing agent to be used is determined by the concentration that can safely be used under the conditions ultimately existing in the fuel zone of the rocket, or by that excess over the stoichiometric amount required for complete combustion of the fuel, whichever limit is reached first. Obviously, the safety limit will vary according to the type of auxiliary oxidizing agent used, the type of fuel base material used together with its heat capacity and heat transmission properties, the temperature which will exist in the preparation and use of the fuel, etc.

Since the fuel composition of this invention can be used according to various methods, varying from that in which the entire amount of oxidizing agent is supplied from the fluid pumped through the linear opening to that in which the combustion is self-sustained by the oxidizing compound contained in the fuel, the minimum amount of such oxidizing agent contained in the fuel will depend on the manner in which the fuel is to be used. When the combustion is to be maintained partly by an oxidizing agent in the fuel and partly by the oxidizing agent pumped through the opening, then obviously the supplemental effect of one agent toward the other will depend on the particular material being used as the oxidizing agent in the fuel and on the particular oxidizing fluid being fed through the opening.

Moreover, in each case the relative amounts cannot be determined on a weight basis but must be determined on the basis of the amount of oxygen available in the particular oxidizing agent used to support the combustion. This depends on the oxygen content of the oxidizing agent and the percent of that oxygen that is liberated for oxidizing purposes upon decomposition of the oxidizing agent. Furthermore, this depends somewhat on the efficiency with which it is desired to consume the fuel. For example, it might be desirable to have a considerable excess of oxidizing agent so as to consume the fuel more completely, even though it might mean an inefficient use of the oxidizing agent. Again, if it is permissible to use the fuel with a low efficiency for use of B.t.u. content, then it may be desirable to use a smaller amount of oxidizing agent.

The amount of oxidizing agent imbedded in the fuel itself can be further decreased when a supplemental oxidizing fluid is being pumped through the linear opening. Obviously, therefore, the proportion of oxidizing agent imbedded in the fuel base material can vary from zero to approximately 95 percent depending on the various factors involved, such as the efficiency desired, the method and convenience of operation, and the materials being used. Generally, when an oxidizing agent is imbedded in the base material, it is advantageous to use from 1 percent, preferably about 5 percent, to about 75 percent based on the combined weight of oxidizing agent, base material, and any crosslinking modifier that is used.

When an oxidizing agent is used in the fuel base material of the type and in the amount that will be self-sustaining in the combustion of the fuel base material, there will be no need to flow an oxidizing fluid through the opening of the fuel. In such cases, the combustion of the fuel is initiated by igniting with various compositions as are presently used for that purpose, such as a mixture of hydrazine, or unsymmetrical dimethyl hydrazine and nitric acid, or by triethyl aluminum and oxygen, or by a torch, or by an electrical ignition system. When an oxidizing agent is not present in the fuel, or is not of the self-sustaining type, liquid oxygen or an efficient oxidizing compound such as perchloryl fluoride ($FClO_3$) can be pumped into the opening to supply the oxygen for combustion. In some cases highly concentrated hydrogen peroxide, such as 98 percent hydrogen peroxide can be used to supply oxygen for combustion.

When a self-sustaining oxidizing agent is distributed throughout the fuel, the desirable amount can be determined by calculating the stoichiometric equivalent required for combustion of the fuel, and adjusting the calculation by subtracting where less than 100 percent efficiency is satisfactory or adding where desired, an excess to compensate for the lack of 100 percent efficiency in the actual combustion. Since the conditions of operation do not permit the time and typing mixing which give 100 percent efficiency, where other factors permit it is sometimes desirable to have an excess of oxidizing agent which will give 50 percent, or even as high as 100 percent more than the stoichiometric amount of oxygen. When it is permissible or desirable to sacrifice some of the efficiency of the B.t.u. content of the fuel, the stoichiometric amount or even less than that amount of the oxidizing agent can be used, depending on the fuel efficiency desired.

The auxiliary oxidizing agent and/or modifier can be introduced or suspended in the solid fuel in any convenient or appropriate manner. The mixture can be effected mechanically as on mixing mills, on a Banbury mixer, any single or double worm extruder, or by rotation of the mold when the material is being cast from a liquid state. When a solid is to be added, the thermoplastic material can desirably be softened by the addition of a softening agent or, as indicated above, by the modifier itself. Such compounded mixtures can then be extruded, or otherwise shaped into the desired form, and then irradiated. However, whichever method of mixing is used, it is desirable to avoid the generation of heat that will raise the temperature to the ignition point of the oxidizing agent. Therefore, in some cases it is desirable to precool the materials to be mixed or to provide means to withdraw the heat as it is generated.

Other oxidizing agents which can be incorporated in accordance with safety conditions determined by their reactivity are solid and liquid perchloryl aryl compounds of the formula $Ar-ClO_3$, such as perchloryl benzene, etc., ammonium persulfate, potassium permanganate, manganese dioxide, potassium iodate, potassium nitrate, potassium dichromate, chloric acid, perchloric acid, etc. Some of these are not self-sustaining oxidizing agents, and can be used when free oxygen, or compositions such as perchloryl fluoride, highly concentrated hydrogen peroxide, etc., which generate oxygen in situ, are passed through the linear opening. The liquid oxidizing agents can be incorporated with precautions to assure uniform distribution through the polymer mass and to avoid ignition or explosive conditions during preparation and use of the fuel.

The term "irradiation," as used herein, means high energy radiation and/or the secondary energies resulting from conversion of this electron energy to neutron or gamma radiation, said electron energies being at least about 100,000 electron volts. While various types of irradiation are suitable for this purpose, such as X-ray and gamma and beta rays, the radiation produced by high power electron linear accelerators has been found to be very conveniently and economically applicable and to give very satisfactory results. However, regardless of the type of irradiation and the type of equipment used for its generation or application, the use thereof in the treatment of polymeric materials as described herein is contemplated as falling within the scope of this invention so long as it is produced by or from electron energy of at least about 100,000 electron volts. While there is no upper limit to the electron energy that can be so applied advantageously, the effects desired in the practice of this invention can be accomplished without having to go above 50,000,000 electron volts. Generally, the higher the electron energy used, the greater is the depth of penetration into the massive structure of polymeric materials, and the shorter is the time of exposure required to accomplish the desired result. For other type of irradiation, such as gamma and X-rays, energy systems equivalent to the above range of electron volts are desirable.

It is intended that the term "irradiation" include what has been referred to in the prior art as "ionizing radiation" which has been defined as radiation possessing an energy at least sufficient to produce ions or to break chemical bonds and thus includes also radiations such as "ionizing particle radiation" as well as radiations of the type termed "ionizing electromagnetic radiation."

The term "ionizing particle radiation" has been used to designate the emission of electrons or highly accelerated nuclear particles such as protons, neutrons, alpha-particles, deuterons, beta-particles, or their analogs, directed in such a way that the particle is projected into the mass to be irradiated. Charged particles can be accelerated by the aid of voltage gradients by such devices as accelerators with resonance chambers, Van de Graff generators, betatrons, synchrotrons, cyclotrons, etc. Neutron radiation can be produced by bombarding a selected light metal such as beryllium with positive particles of high energy. Particle radiations can also be obtained by the use of an atomic pile, radioactive isotopes or other natural or synthetic radioactive materials.

"Ionizing electromagnetic irradiation" is produced when a metallic target, such as tungsten, is bombarded with electrons of suitable energy. This energy is conferred to the electrons by potential accelerators of over 0.1 million electron volts (mev.). In addition to radiations of this type, commonly called X-ray, an ionizing electromagnetic radiation suitable for the practice of this invention can be obtained by means of a nuclear reactor (pile) or by the use of natural or synthetic radioactive material, for example Cobalt 60.

Various types of high power electron linear accelerators are commercially available, for example from Applied Radiation Corporation, Walnut Creek, California. In the following Example I, Arco type travelling wave accelerator, model Mark I, operating at 3 to 10 million electron volts, was used to supply the irradiation. Other type of accelerators, such as supplied by High Voltage Engineering Corporation, Burlington, Massachusetts, or as described in United States Patent No. 2,763,609 and in British Patent No. 762,953 are satisfactory for the practice of this invention.

In the following examples, the radiation doses are reported in megareps, which represent 1,000,000 reps. A "rep" is defined, according to "Reactor Shielding Design Manual" edited by Theodore Rockwell III and published by D. Van Nostrand Company, Inc., 1st edition, 1956, as that radiation dosage which produces energy absorption in human tissue equal to 93 ergs per gram of tissue.

In the practice of this invention, changes in properties of the materials can often be noted after treatment with even less than 1 megarep. However, it is generally advantageous to use doses of 2 megareps or more. The degree of change in properties is dependent somewhat on the dosage, greater changes being effected by increasing the dosage.

The material to be treated is often advantageously irradiated while in a container made of a material such as aluminum or glass which will not substantially interfere with the irradiation. It is advantageous also to use polymeric materials, such as polyethylene, nylons, i.e. 66 nylon, polycaprolactam, etc. It can also be wrapped in film or foil impervious to vapors and gases, such as aluminum foil, polyethylene film, etc., which will prevent substantially the escape of volatile materials. It is often advantageous to avoid oxidation or side reactions by the use of an inert atmosphere such as nitrogen. Moreover, it is advantageous to prevent the temperature from approaching that at which the material is unstable. This can be accomplished by cooling the material before irradiation, for example with Dry Ice, or by dissipating the heat generated during irradiation.

Various methods of practicing the invention are illustrated by the following examples. These examples are intended merely to illustrate the invention and not in any sense to limit the manner in which the invention can be practiced. The parts and percentages recited therein and all through this specification, unless specifically provided otherwise, refer to parts by weight and percentages by weight. Unless indicated otherwise, the terms "polymers" and "polymeric" are intended to include "copolymers" and "copolymeric." Molecular weights given herein are Staudinger molecular weights.

*Example I*

A thermoplastic or unvulcanized synthetic rubber copolymer of 75 percent butadiene and 25 percent styrene is molded in the form of a cylinder three feet long and six inches cross-sectional diameter. An opening of one inch diameter is drilled along the linear axis of the cylinder. The cylinder is then exposed to 35 megareps of irradiation and subsequently used satisfactorily in a rocket with liquid oxygen fed through the opening in the cylinder.

*Example II*

The process of Example I is repeated, using unvulcanized natural rubber instead of the copolymer and using Cobalt 60 as the irradiation source. The fuel operates satisfactorily as in Example I.

*Example III*

The copolymer of Example I is mixed on a Banbury mixer with 10 percent divinyl benzene, based on the combined weight of the copolymer and modifier, and then molded in the cylindrical shape described in Example I. The product is wrapped in polyethylene film and irradiated, as in Example I, with a dosage of 20 megareps.

*Example IV*

The procedure of Example III is repeated satisfactorily using a mixture of the thermoplastic rubber of Example II and 20 percent diisopropenyl benzene, based on the combined weight of the rubber and modifier, with X-ray irradiation of the same dosage, and using liquid perchloryl fluoride in place of the liquid oxygen.

*Example V*

The procedure of Example III is repeated using thermoplastic synthetic rubber at 70 percent butadiene and 30 percent acrylonitrile, and 15 percent divinyl naphthalene, based on the combined weight of the rubber and modifier, with the same dosage of irradiation supplied from a Van de Graff generator. The product is used satisfactorily in a rocket using liquid oxygen pumped through the opening in the cylinder.

*Example VI*

The procedure of Example III is repeated using a thermoplastic rubber copolymer of 98 percent isobutylene and 2 percent butadiene, and 10 percent divinyl diphenyl, based on the combined weight of rubber and modifier, with the same dosage of irradiation derived from bombarded beryllium. The product operates satisfactorily as in Example I.

*Example VII*

The procedure of Example I is repeated in which the copolymer has been modified by the addition of 10 percent of the diacrylate of hexamethylene glycol, based on the combined weight of rubber and modifier, and an irradiation dosage of 20 megareps.

*Example VIII*

The copolymer of Example I is mixed on a Banbury mixer with 25 percent of ammonium perchlorate, based on the combined weight of copolymer and perchlorate, care being taken that the temperature of the mixture does not rise above 35° C. The resultant mixture is shaped into a cylinder four feet long and five inches outside diameter with an opening one inch in diameter running along the linear axis of the cylinder. The cylinder is cooled to a temperature below 25° C., wrapped in polyethylene film, and then exposed to 25 megareps of irradiation as in Example I, the temperature being checked periodically and being allowed to cool whenever the temperature approaches 35° C. The irradiated product is inserted in a rocket adapted for that size cylinder and ignited with a mixture of hydrazine and nitric acid used for rocket ignitions, and operates successfully in self-sustained combustion.

*Example IX*

The procedure of Example VIII is repeated, except that 10 percent of the divinyl ether of bis-phenol (based on the combined weight of rubber and modifier) is added to the thermoplastic rubber prior to the mixing of ammonium perchlorate therewith. The irradiated product operates successfully in a rocket as in the preceding example.

*Example X*

The procedure of Example VIII is repeated with similar success using unvulcanized chloroprene rubber instead of the copolymer of Example I, and 20 percent potassium perchlorate (based on the combined weight of rubber and perchlorate) instead of the ammonium perchlorate.

*Example XI*

The procedure of Example IX is repeated with similar success using divinyl benzene in place of the divinyl ether of bis-phenol, and using 20 percent perchloryl benzene (based on combined weight of rubber, modifier, and perchloryl compound) instead of the ammonium perchlorate.

*Example XII*

The procedure of Example IX is repeated twice, using in one case 20 percent (based on combined weight of rubber and modifier) of a commercial divinyl benzene mixture containing 50 percent divinyl benzene and 50 percent ethyl styrene, in place of the divinyl ether of bis-phenol, and using 65 percent potassium perchlorate (based on combined weight of rubber, modifier, and perchlorate) instead of the ammonium perchlorate; in the other case 20 percent (based on combined weight of rubber and modifier) of the allyl ester of 11-acryloxy-undecanoic acid is used instead of the divinyl ether of bis-phenol, and 70 percent ammonium perchlorate (based on combined weight of rubber, modifier and perchlorate) is used instead of the 25 percent ammonium perchlorate. In each case the product is irradiated as in Example I to a dosage of 20 megareps and is subsequently used successfully in rockets after ignition with a mixture of diallyl catechol and nitric acid as is sometimes used for that purpose.

*Example XIII*

Unvulcanized natural rubber film five feet wide is wound on a bar having a two inch diameter and a thin layer of ammonium perchlorate powder is spread evenly on the inner surface of the film as it is rolled on to the bar in such a manner that the powder is trapped between successive layers of the film as it is wound. A roller is pressed against the cylinder of film as it is wound in such a manner that the powder is imbedded in the film. When the cylinder reaches a cross-sectional outside diameter of seven inches, the accumulated weight of the ammonium perchlorate represents 50 percent of the combined weight of film and powder. The cylinder is exposed to 30 megareps of irradiation as in Example I, while maintaining the temperature below 30° C. After irradiation, the bar is removed from the center of the cylinder and the irradiated roll used successfully in a rocket as in Example VIII.

*Example XIV*

The procedure of Example XIII is repeated except that a thin layer of divinyl benzene is spread on the film and absorbed before the ammonium perchlorate powder is added thereto. The proportion of ingredients in the resultant roll is 40 parts of film, 10 parts of divinyl benzene, and 50 parts of ammonium perchlorate. After an irradiation dose of 20 megareps, as in Example I, the irradiated product operates successfully in a rocket according to the technique used in Example VIII.

*Example XV*

The procedure of Example XII is repeated twice using the copolymer of Example VI, and using 15 percent divinyl benzene based on the weight of copolymer in each case. In the first case, 60 percent of potassium perchlorate is used and in the second case 70 percent of ammonium perchlorate (based on the combined weight of copolymer, modifier and oxidizing agent). In each case an irradiation dose of 25 megareps is used as in Example I, and the irradiated product is subsequently used successfully in a rocket in accordance with the technique used in Example VIII.

Various crosslinking modifiers can be used in accordance with the practice of this invention, including compounds having one or more ethylenic or acetylenic groups therein. These serve to lower the energy level of irradiation required to produce the desired degree of crosslinking. The modifiers comprise organic compounds containing two unsaturated groups of the ethylenic or acetylenic type or derivatives thereof, which are connected through groups or linkages which are relatively stable to irradiation.

One type of preferred crosslinking modifier includes those having the formula:

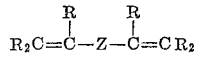

wherein Z is a divalent aromatic or aliphatic (including cycloaliphatic, unsaturated aliphatic, and heterocyclic groups containing in the ring structure, carbon, and a minor part of nitrogen and/or oxygen) groups and combinations thereof, in which groups there are at least two carbon atoms between said valencies; R is hydrogen, or an alkyl, aryl, chloro, fluoro, cyano, —COOR″, —CH$_2$COOR″, two R's can also represent a third bond between the two carbons, and R can also be joined with another R or Z to form a cycloaliphatic or heterocyclic ring containing a minor portion of nitrogen and/or oxygen, and R″ is hydrogen or a hydrocarbon group; preferably R is hydrogen, or two R's represent a third bond between the two carbons, or one R substituted with a lower alkyl group, such as methyl or ethyl. Z, K, and the R groups can have substituted thereon radicals which will not interfere with irradiation, such as hydrocarbon, chloro, fluoro, alkoxy, aryloxy, cycloalkoxy, alkaryloxy, aralkoxy, acyloxy, cyano, —COOR″, —CH$_2$COOR″, etc.

Typical compounds of the above formula include the following: dialkenyl aryl compounds, dialkenyl alkanes, dialkenyl cycloalkanes, dialkenyl derivatives of pyridine, piperidine, morpholine, furane, pyrimidine, piperazine, etc., alkenyl cycloalkenes, etc.

Another preferred type of modifier includes compounds having the formula A—Z—A' wherein A and A' can be identical or dissimilar groups selected from the formulas:

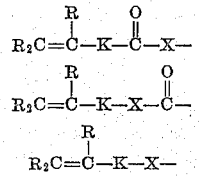

wherein K is any divalent aromatic or aliphatic group (including cycloaliphatic, unsaturated aliphatic, and heterocyclic groups containing in the ring structure, carbon, and a minor part of nitrogen and/or oxygen) and combinations thereof, and can also represent a single bond between the two adjacent atoms; X is oxygen or NR'', R'', Z and R are as defined above. Compounds of this formula include polyunsaturated polyesters, polyethers, ether-esters, polyamides, polyamines, amide-esters, amine-esters, ether-amides, ether-amines. Groups on Z, K, and R are as indicated above.

Other modifiers that can be used advantageously include those having the formulas:

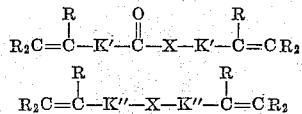

wherein R and X are as defined above, and K' and K'' are the same as defined above for K, but the sum of carbon atoms between said valencies in the two K's is at least 2, and the sum of carbon atoms between said valencies in the two K''s is at least 3. Compounds fitting these formulas are polyunsaturated monoesters, monoethers, monoamides, and monoamines having 3 or more carbon atoms between the unsaturated groups.

Other modifiers, less desirable than those indicated above, can be used which have one of the following formulas:

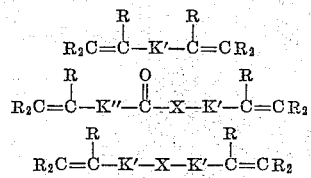

wherein R and X are as defined above; K' is as defined above, except that when it is a divalent radical, then, both valencies are attached to the same carbon atom; and K'' is a single bond, or, when K' in the same compound is a single bond, then K'' can be a divalent radical having both valencies on the same carbon atom. Such compounds include butadiene-1,3 and its derivatives, pentadiene-1,4 and its derivatives, 1-vinyl-cyclohexene-1 and its derivatives, 1-vinyl-cyclohexene-2 and its derivatives, 4,4-divinyl piperidine, 1,1-divinyl-cyclohexane, furane, 3-allyl-furane, allyl acrylate, vinyl acrylate, isopropenyl methacrylate, isopropenyl chloracrylamide, vinyl methacrylamide, allyl acrylamide, vinyl acrylamide, vinyl crotonate, vinyl buten-3-oate, isopropenyl buten-3-oate, vinyl buten-3-amide, isopropenyl buten 3-amide, divinyl ether, diallyl ether, divinyl amine, diisopropenyl amine, vinyl allyl amine, diallyl amine, etc.

Polyalkenyl aryl compounds which can be used in the practice of this invention include; divinyl benzene, trivinyl benzene, divinyl naphthalene, trivinyl naphthalene, divinyl diphenyl, trivinyl diphenyl, divinyl toluene, trivinyl toluene, divinyl xylene, divinyl anisole, divinyl ethyl benzene, divinyl chlorobenzene, divinyl methylnaphthalene, divinyl ethylnaphthalene, divinyl methyldiphenyl, divinyl ethyldiphenyl, divinyl ethoxy naphthalene, divinyl chloronaphthalene, divinyl chlorodiphenyl, divinyl ethoxy diphenyl, vinyl isopropenyl benzene, vinyl isopropenyl naphthalene, vinyl isopropenyl diphenyl, vinyl isopropenyl toluene, vinyl isopropenyl anisole, vinyl isopropenyl chlorobenzene, vinyl isopropenyl methoxy naphthalene, vinyl isopropenyl chloronaphthalene, vinyl isopropenyl methyl chloronaphthalene, vinyl isopropenyl chlorodiphenyl, vinyl isopropenyl methoxy diphenyl, vinyl isobutenyl benzene, vinyl isobutenyl naphthalene, vinyl isobutenyl diphenyl, vinyl allyl benzene, vinyl allyl naphthalene, vinyl allyl diphenyl, vinyl allyl toluene, vinyl allyl anisole, vinyl allyl methylnaphthalene, vinyl allyl chlorodiphenyl, diallyl benzene, triallyl benzene, diallyl naphthalene, triallyl naphthalene, diallyl diphenyl, triallyl diphenyl, diallyl toluene, diallyl xylene, diallyl chlorobenzene, diisopropenyl benzene, diisopropenyl naphthalene, diisopropenyl diphenyl, diisopropenyl toluene, diisopropenyl anisole, diisopropenyl methyl naphthalene, diisopropenyl chlorodiphenyl, dimethallyl benzene, dimethallyl naphthalene, dimethallyl diphenyl, bis-(alpha-ethyl-ethenyl)-benzene, bis-(alpha-ethyl-ethenyl)-naphthalene, bis-(alpha-ethyl-ethenyl)-diphenyl, bis-(alpha-vinyl-ethyl)-benzene, bis-(alpha-vinyl-ethyl)naphthalene, bis-(alpha-vinyl-ethyl)-diphenyl, vinyl (alpha-vinyl-ethyl)-benzene, vinyl (alpha-vinyl-ethyl)-naphthalene, vinyl (alpha-vinyl-ethyl)-diphenyl, etc.

Other polyalkenyl aryl compounds that can be used include: dicrotyl benzene, dicrotyl naphthalene, dicrotyl diphenyl, dicrotyl anisole, dicrotyl xylene, bis-(4-vinyl-n-butyl)-benzene, bis-(5-isopropenyl-n-hexyl)-benzene, bis-(5-isopropenyl-n-hexyl)-diphenyl, bis-(5-methyl-hepten-5-yl)-benzene, bis-(5-methyl-nonene-6-yl)-diphenyl, bis-(n-decen-5-yl)-toluene, di-cyclopentenyl-naphthalene, divinyl carbazole, di-cyclohexenyl-benzene, etc.

Typical acetylenic hydrocarbons that can be used in the practice of this invention include: phenylene diacetylene, naphthylene diacetylene, ethylene diacetylene, cyclohexylene diacetylene, n-hexene-5-yl-acetylene, etc.

Typical polyalkenyl aliphatic compounds that can be used in the practice of this invention include: diallyl, 1,6-heptadiene; 1,8-nonadiene; 2,8-decadiene; 2,9-dimethyl-2,8-decadiene, divinyl cyclohexane, divinyl cyclopentane, divinyl methyl cyclohexane, diallyl cyclohexane, diallyl cyclopentane, dibutenyl cyclohexane, dipentenyl cyclohexane; 1-vinyl-cyclohexene-3; 1-allyl-cyclohexene-2; 1-allyl cyclohexene-3; diallyl cyclohexene, divinyl cyclohexene, divinyl piperidine, diallyl piperidine, diisopropenyl piperidine, divinyl pyridine, diallyl pyridine, diisopropenyl pyridine, dibutenyl pyridine; 3,5-divinyl morpholine; 2,5-divinyl piperazine; 1,4-divinyl piperazine, (beta-vinylalkyl)-furane, (beta-allyl-ethyl)-furane, 1,7-diphenyl-heptadiene-1,6, 2,7-diphenyl-octadiene-1,7, etc.

Various polyunsaturated polyesters suitable for the practice of this invention can be derived by forming the esters of acrylic acid and its various derivatives as indicated above with various polyhydroxy compounds of the formula:

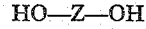

with Z as defined above. The various acrylic derivatives are the alpha-methyl (methacrylic), alpha-chloro (chloracrylic), beta-methyl (crotonic), alpha-chloro-beta-methyl and alpha,beta-dimethyl derivatives. Examples of various polyhydroxy compounds from which the polyesters can be prepared are:

ethylene glycol,
trimethylene glycol,
tetramethylene glycol,
2,3-dihydroxybutane,
1,4-dihydroxybutane,
1,4-dihydroxy-2-phenylbutane,
1,6-dihydroxy-hexane,
1,8-dihydroxy-octane,
2,11-dihydroxy-dodecane,
2,11-dimethyl-2,11-dihydroxy-dodecane,
resorcinol,
hydroquinone,
catechol, dihydroxynaphthalene,
trihydroxy benzene,
trihydroxy naphthalene,
dihydroxymethylnaphthalene,
dihydroxy toluene,
dimethylol benzene,
di-(beta-ethylol)-benzene,
di-(alpha-ethylol)-benzene,
di-(beta-ethylol)-naphthalene,
bisphenol or
2,2-di-(p-phenylol)-propane,
beta-ethylol-phenol,
beta-ethylol-naphthol,
omega-hydroxy-n-octyl-phenyl,
n-octyl-resorcinol,
alpha-methyl-heptyl-resorcinol,
sec-butyl-resorcinol,
ethoxy-resorcinol,
1,8-dihydroxy-4-acetoxy-octane,
phenoxy resorcinol,
beta-phenylethoxy-hydroquinone,
(ethylphenoxy)-catechol,
acetoxy-dihydroxy naphthalene,
1,4-dihydroxy-cyclohexane,
1,4-dimethylol-cyclohexane,
benzoxy-resorcinol,
octoxy-bisphenol,
2,2-dimethyl-propanediol-1,3,
3-methyl-pentanediol-1,4,
2,2-diethylbutanediol-1,3,
4,5-dihydroxy-nonane,
pentamethylene glycol,
heptamethylene glycol,
nonamethylene glycol,
decamethylene glycol,
glyceryl monoacetate,
glyceryl monobenzoate,
dihydroxy-vinyl-naphthalene,
2,11-dihydroxy-dodecene-5,
2,11-dihydroxy-6-vinyl-dodecane,
2,34-dihydroxy lycopene,
dihydroxy-ethyl naphthalene,
dihydroxy-ethoxy-naphthalene,
dihydroxy-diphenyl,
dihydroxy-phenethoxy-diphenyl,
(ethylphenyl)-hydroquinone,
(ethyl-phenoxy)-resorcinol,
2-phenoxy-propane-1,3-diol,
beta-ethylol-hydroxy-diphenyl,
gamma-hydroxy-propyl-phenol,
2-hydroxy-8-phenylol-nonane,
2,8-dihydroxy-4-phenyl-nonane, etc.

Except for practical limitations of availability there would be no upper limit to the number of carbon atoms between the hydroxy groups, particularly when Z is aliphatic since irradiation can also cause crosslinking through that part of the molecule, especially when Z includes aliphatic unsaturation such as in derivatives formed from 2,11-dihydroxy-dodecene-6, 2,11-dihydroxy-6-vinyl-dodecane, 2,34-dihydroxy-lycopene, vinyl-dihydroxy-naphthalene, etc.

Such polyunsaturated polyesters which can be used in the practice of this invention include the following as examples:

ethylene glycol diacrylate and
dimethacrylate,
trimethylene glycol diacrylate,
tetramethylene glycol dimethacrylate,
pentamethylene glycol dicrotonate,
hexamethylene glycol-di-(chloracrylate),
diacrylate of 2,3-dihydroxybutane,
dimethacrylate of 1,3-dihydroxy-butane,
diacrylate of 1,6-dihydroxy-hexane (hexamethylene glycol),
dimethacrylate of 1,8-dihydroxyoctane,
di-chloracrylate of 2,11-dihydroxy-dodecane,
dicrotonate of 2,11-dimethyl-2,11-dihydroxy-dodecane,
diacrylate of decamethylene glycol,
diacrylate of glyceryl monoacetate,
dimethacrylate of glyceryl monostearate,
diacrylate of glycerine,
diacrylate of dihydroxy-ethoxy naphthalene,
diacrylate of (ethylphenyl)-hydroquinone,
dimethacrylate of (ethylphenoxy)-resorcinol,
diacrylate of di-(beta-ethylol)-benzene,
diacrylate of omega-hydroxy-n-octyl-phenol,
dicrotonate of dihydroxy-methylnaphthalene,
di(chloracrylate) of dihydroxy-diphenyl, the acrylate-methacrylate mixed ester of dihydroxy-diphenyl, the crotonate-chloro-acrylate mixed ester of resorcinol, etc.

Polyunsaturated polyesters suitable for the practice of this invention can also be derived by forming the esters of unsaturated alcohols such as vinyl, isopropenyl, alpha-chloro-vinyl, allyl, methallyl, alpha-phenethylallyl, beta-chlorallyl, alpha-phenyl-allyl alcohols, 2-methylol-1,4-butadiene, 7-hydroxy-octene-1, 7-hydroxy-2-methyl - octene-1, 2-hydroxy-2-methyl-octadiene-4,7, 3 - hydroxy-3-methyl-butene-1, penten-1-ol-5, 2,5-dimethyl-5-hydroxy-hexene-1, 17-hydroxy-octadecene-1; 5-acetoxy-7-hydroxy-octene-1; 5-phenoxy-7-hydroxy-octene-1, etc. with polycarboxylic acids of the formula HOOC—Z—COOH, with Z defined as above.

Various polycarboxylic acids from which the polyunsaturated polyesters can be prepared include: phthalic, isophthalic, trimellitic, terephthalic, acetoxy-phthalic, phenoxy-phthalic, 3-vinyl-phthalic, 3-allyl-phthalic, phenethoxy terephthalic, naphthalene dicarboxylic, diphenyl dicarboxylic, butyroxy-naphthalene dicarboxylic, octyl-naphthalene dicarboxylic, nonyl-diphenyl dicarboxylic, sebacic, acetoxy-sebacic, azelaic butoxy-azelaic adipic, itaconic, glutaconic, decapentaene-10-dicarboxylic, pimelic, ethyl-phenyl-glutaric, benzoxy-glutaric, glutaric, octyl-succinic, phenyladipic, japanic (nonadecene-1,19-dicarboxylic acid), thapsic, malonic, methyl-succinic hydroxy-succinic, brassilic, suberic acids, etc. and also including the condensation products of maleic anhydride with $C_{22}$ and similar olefins, and their hydrogenation products.

Typical polyunsaturated polyesters which can be used in the practice of this invention include the following: divinyl phthalate, diallyl phthalate, diallyl-acetoxy-phthalate, diisopropenyl phthalate, dimethallyl phthalate, diallyl butoxy phthalate, di-(alpha-chloro-vinyl) phthalate, di-(1-methyl-5-vinyl-pentyl)phthalate, diallyl terephthalate, divinyl terephthalate, triallyl-trimellitate, diisopropenyl naphthalene dicarboxylate, dimethallyl-diphenyl dicarboxylate, di-(alpha-chloro-vinyl) octyl-naphthalene dicarboxylate, diallyl succinate, divinyl succinate, diisopropenyl succinate, divinyl adipate, diallyl phenyl adipate, diisopropenyl butoxy-azelate, di-beta-chlorallyl)-acetoxy-phthalate, dimethallyl phenoxy-naphthalene dicarboxylate, etc.

Polyunsaturated polyethers suitable for the practice of this invention can be derived by forming the ethers of unsaturated alcohols such as vinyl,
isopropenyl,
alpha-chloro-vinyl,
allyl,
methallyl,
alpha-phenethylallyl,
beta-chlorallyl,
alpha-phenyl-allyl alcohols,
7-hydroxy-octene-1,
7-hydroxy-2-methyl-octene-1,
3-hydroxy-3-methyl-butene-1,
penten-1-ol-5,
2,5-dimethyl-5-hydroxy-hexene-1, 17-hydroxy-octadecene-1,
5-acetoxy-7-hydroxy-octene-1,
5-phenoxy-7-hydroxy-octene-1, etc., with polyhydric compounds of the formula

HO—Z—OH with Z defined as above.

Examples of various polyhydric compounds from which the polyethers can be prepared are ethylene glycol,
trimethylene glycol,
2,3-dihydroxybutane,
1,4-dihydroxybutane,
1,3-dihydroxy-2-phenyl-butane,
1,6-dihydroxyhexane,
1,8-dihydroxy-octane,
2,11-dihydroxy-dodecane,
2,11-dimethyl-2,11-dihydroxy-dodecane,
2,2-dimethyl-propanediol-1,3,
3-methylpentanediol-1,4,
2,2-diethylbutanediol-1,4,
4,5-dihydroxy-nonane,
pentamethylene glycol,
heptamethylene glycol,
nonamethylene glycol,
decamethylene glycol,
glyceryl monoacetate,
glyceryl monobenzoate,
resorcinol,
hydroquinone,
catechol,
dihydroxymethylnaphthalene,
dihydroxy-vinyl-naphthalene,
2,11-dihydroxy-dodecane-6,
2,11-dihydroxy-6-vinyl-dodecane,
2,34-dihydroxy lycopene,
dihydroxy-ethyl naphthalene,
dihydroxy-ethoxy-naphthalene,
dihydroxy-diphenyl,
dihydroxy-phenethoxy-diphenyl,
(ethylphenyl)-hydroquinone,
(ethylphenoxy)-resorcinol,
2-phenoxy-propane-1,3-diol,
beta-ethylol-hydroxy-diphenyl,
gamma-hydroxy-propyl-phenol,
2-hydroxy-8-phenylol-nonane,
2,8-dihydroxy-4-phenyl-nonane,
dihydroxy-toluene,
dimethylol benzene,
di-(beta-ethylol)-benzene,
di-(alpha-ethylol)-benzene,
di-(beta-ethylol)-naphthalene,
bisphenol or
2,2-di-(p-phenylol)-propane,
beta-ethylol-phenol,
beta-ethylol-naphthol,
omega-hydroxy-n-octyl-phenol,
n-octyl-resorcinol,
alpha-methyl-heptyl-resorcinol,
sec-butyl resorcinol,
ethoxy-resorcinol,
1,8-dihydroxy-4-acetoxy-octane,
phenoxy resorcinol,
beta-phenylethoxy-hydroquinone,
(ethylphenoxy)-catechol,
acetoxy-dihydroxy naphthalene,
benzoxy resorcinol,
octoxy-bisphenol, etc.

Except for practical limitations of availability, there is no upper limit to the number of carbon atoms between the hydroxy groups, particularly when Z is aliphatic since irradiation can cause crosslinking through that part of the molecule.

Polyunsaturated polyethers which can be used in the practice of this invention include the following as examples: the divinyl diethers of ethylene glycol, trimethylene glycol, pentamethylene glycol, hexamethylene glycol, 2,3-dihydroxybutane, 1,4-hydroxybutane, 1,4-dihydroxy-phenylbutane, resorcinol, di-(beta-ethylol) - benzene, etc., various diallyl diethers, such as the diallyl diether of ethylene glycol, trimethylene glycol, tetramethyene glycol, 2,3-dihydroxy-butane, resorcinol, beta-ethylol phenol, bisphenol, etc.; the diisopropenyl diethers of the aforementioned polyhydric compounds, such as the diisopropenyl diether of ethylene glycol, trimethylene glycol, tetramethylene glycol, 1,6-dihydroxy hexane, trihydroxy benzene, trimethylol benzene, etc.; dimethallyl diethers of ethylene glycol, trimethylene glycol, pentamethylene glycol, resorcinol, etc.; diethers of 2-methylolbutadiene-1,4, and of 2-hydroxy-2-methyl-octadiene - 4,7 with dihydroxy naphthalene, dihydroxy toluene, beta-ethylol-phenol, ethoxy resorcinol, etc.; the di-(alpha-chloro-vinyl)diether of 1,8-dihydroxy-octane, the ethylene glycol diether of 7-hydroxy-2-methyl-octene-1, the diether of beta-ethylol-phenol and 3-hydroxy-3-methyl-butene-1, the ethylene glycol diether of 17-hydroxy-octodecene-1, the decamethylene glycol diether of pentene-1-ol-5, the diether of gamma-hydroxy-propyl-phenol and 5-phenoxy-7-hydroxy-octene - 1, the diether of alpha-phenethyl-allyl-alcohol and beta-ethylol-hydroxy-diphenyl, the diether of dihydroxy-phenoxy-naphthalene and 5-phenoxy-7-hydroxy-octene-1, etc., as well as corresponding triethers such as trivinyl, triisopropenyl, triallyl triethers of 2,5,7-trihydroxy-n-octane, trihydroxy-benzene, trimethylol benzene, trihydroxy naphthalene, etc., divinyl diethers of benzoxy-resorcinol, phenethyl-resorcinol, acetoxy-resorcinol, propyl-resorcinol, propoxy-resorcinol, etc., diallyl diethers of 1,3-dihydroxy-3-phenyl-butane, 5-ethoxy-2,7-dihydoxy-n-octane, (beta-hydroxy-ethyl)-phenyl, phenol, etc.

Examples of other polyunsaturated polyesters that can be used include: tetramethylene bis-hexen-5-oate, trimethylene bis-octen-4-oate, hexamethylene bis-hepten-4-oate, tetramethylene glycol diester of the monomethyl ester of maleic acid, the ethylene glycol diester of the monoethyl ester of itaconic acid, the tetramethylene glycol diester of beta-cyano-acrylic acid, the hexamethylene glycol diester of cyclohexene-3-formic acid, the tetramethylene glycol diester of cyclopentene-3-formic acid, octen-4-yl-5-crotonoxy - caproate, decen-6-yl 11 - (beta-cayno-acryloxy)-octadecanoate, hexen-3-yl 8-(p-butenyl-benzoxy)-octanoate, diallyl cyclohexylene diacetate, dibutenyl cyclohexylene-diformate, etc.

Examples of other polyunsaturated polyethers that can be used include: the ethylene glycol diether of 17-hydroxy-octadecene-8, the hexamethylene glycol diether of penten-3-ol-1, the hexamethylene glycol diether of 7-hydroxy-octene-4, the tetramethylene glycol diether of cyclohexen-3-ol, the ethylene glycol diether of cyclohexene-3-ethylol, the cyclohexene glycol diether of hexene-3-ol-1, bis(beta-n-octyloxy - ethyl) - cyclohexane, etc.

Various polyunsaturated polyamides suitable for the practice of this invention can be derived by forming the amides of acrylic acid and its various derivatives with various polyamino compounds of the formula:

RHN—Z—NHR with Z and R as defined above.

Typical polyunsaturated polyamides that can be used in the practice of this invention include the following as examples: ethylene diacrylamide and dimethacrylamide, trimethylene diacrylamide, tetramethylene dimethacrylamide, pentamethylene dicrotonamide, hexamethylene di-(chloracrylamide), diacrylamide of 2,3-diaminobutane, dimethacrylamide of 1,3-diaminobutane, diacrylamide of 1,6 - diaminohexane, dimethacrylamide of 1,8 - diamino octane, di - chloroacrylamide of 2,11 - diamino dodecane, dicrotonamide of 2,11-dimethyl-2,11-diamino dodecane, diacrylamide of decamethylene diamine, dimethacrylamide of (phenyl diamine), diacrylamide of di-(beta-amino-ethyl)-benzene, dicrotonamide of diamino methyl naphthalene, di(chloracrylamide) of diamino - diphenyl, the acrylamide-methacrylamide mixed amide of diamino diphenyl, the crotonamide-acrylamide mixed amide of phenylene diamine, the ethylene diamide of hexen-3-oic acid, the tetraethylene diamide of octen-5-oic acid, the trimethylene diamide of the monomethylamide maleic acid, the hexamethylene diamide of the monoethyl ester of itaconic acid, the hexamethylene diamide of beta-cyano-acrylic acid, etc.

Polyunsaturated polyamides suitable for the practice of this invention can also be derived by forming the amides of unsaturated amines with polycarboxylic acid of the formula HOOC—Z—COOH with Z defined as above. Typical suitable carboxylic acids of this formula are listed above for use in the preparation of polyesters.

Typical polyunsaturated polyamides of this type include the following: N,N'-divinyl phthalic diamide, N,N'-diallyl phthalic diamide, N,N'-diisopropenyl phthalic diamide, N,N'-dimethallyl phthalic diamide, N,N'-diallyl acetoxy - phthalic diamide, N,N' - di(1-methyl-5 - vinyl-pentyl) phthalic diamide, N,N'-diallyl terephthalic diamide, N,N' - divinyl terephthalic diamide, N,N'N''-triallylmellitic triamide, N,N'-diisopropenyl naphthalene dicarboxylamide, N,N'-methallyl - diphenyl - dicarboxylamide, N,N'-diallyl succinic diamide, N,N'-divinyl succinic diamide, N,N'-diisopropenyl succinic diamide, N,N'-divinyl adipic diamide, N,N'-diallyl phenyl adipic diamide, N,N'-diisopropenyl butoxy-azelaic diamide, N,N'-di-(beta-chlorallyl)-phthalic diamide, N,N'-di-hexen-3-yl itaconic diamide, N,N'-di-octen-5-maleic diamide, N,N'-dicrotyl azelaic diamide, N,N'-dicrotyl naphthalene dicarboxylamide, N,N'-dioctenyl adipic diamide, N,N'-dipropargyl azelic diamide, N,N'-dipropargyl phthalic diamide, N-allyl 5-acrylamido - caproamide, N-butenyl 11-methacrylamido - undecanamide, N - hexen-3-yl 9 - hexenoxy-monamide, etc.

Typical polyunsaturated polyamines that can be used in the practice of this invention include the following as examples:
1,4-bis(vinylamino)-butane,
hexamethylene bis(vinylamine),
1,8-bis-(allylamine)-octane,
1,9-di-(isopropenylamino)-decane,
bis(vinylamino)-benzene,
bis(allylamino)-diphenyl,
bis(isopropenylamino)-naphthalene,
bis(N-methyl-isopropenyl-amino)-benzene,
1,4-bis-(beta-cyclohexene-3-ethyl-amino)-butane,
1,6-bis-n-hexen-3-yl-amino)hexene, etc.

Typical polyunsaturated ester-amides, ether-amides, ester-amines, amino-amides, and ether-amines that can be used in the practice of this invention include as typical examples: pentamethylene monoacrylate monoacrylamide, hexamethylene monomethacrylate monomethacrylamide, trimethylene monoacrylate monomethacrylamide, (para-acryloxy-phenyl) acrylamide, the dimethylamide of the mono-hexen-4-yl ester of itaconic acid, etc., the N-vinyl amide of the monovinyl ester of phthalic acid, the monoallyl amide-monoallyl ester of succinic acid, the hexen-4-yl monoester allyl monoamide of azelaic acid, the allyl ester of 5-acrylamido caproic acid, the isopropenyl ester of 11-methacrylamido undecanoic acid, cyclohexen-3-yl ester of 5-betacyano acrylamidocaproic acid, the vinyl ether of ethylene monoacrylamide, the allyl ether of trimethylene monomethacrylamide, the methallyl ether of tetramethylene monochloracrylamide, the chlorallyl ether of pentamethylene monocrotonamide, the alpha-phenyl-allyl ether of monoacrylamide of 2,11-dimethyl-2-hydroxy - 11 - amino - dodecane, N - allyl 5-allyloxy caproamide, N - isopropenyl 11-(hexen-4-oxy)-octadecanamide, N-vinyl(p-vinyl-phenoxy) - benzamide, 4-vinyl(4-allyloxy-cyclohexyl)-formamide, 1-acryloxy-9-allylamino-nonane, p-(hexen-3-yl-amine)-phenyl methacrylate, (4-allyl-amino - cyclohexy)crotonate, methallyl 11-methallylamino - undecanoate, isopropenyl 5-isopropenylamino-caproate, vinyl 9-(hexen-3-yl-amino)-nonate, N-(4-allylamino - butyl)acrylamide, N-(6 - isopropenyl-amino - hexyl) methacrylamide, N - (p - butenylamino-phenyl) crotonamide, N-(4 - vinyl-amino - cyclohexyl) hexen-4-amide, N-allyl 5-allylamino - caproamide, N-cyclohexenyl 11-cyclohexenylamino - undecanamide, 1-vinyloxy-9-vinylamino-nonane, 2-allyloxy-10-allylamino-undecane, 1-hexenyloxy - 4 - hexenylamino - cyclohexane, etc.

Typical polyunsaturated monoamides and monoamines of the above formulas, suitable for the practice of this invention, include N-(p-vinyl-phenyl)acrylamide,
N-(o-vinyl-phenyl)methacrylamide,
N-(m-vinyl-phenyl)chloracrylamide,
N-(p-vinyl-phenyl)crotonate,
N-(p-isopropenyl-phenyl)acrylamide,
N-(o-isopropenyl-phenyl)-methacrylamide,
N-(m-isopropenyl-phenyl)chloracrylamide,
N-(p-isopropenyl-phenyl)crotonamide,
N-(p-allyl-phenyl)arcylamide,
N-(p-allyl-phenyl)crotonamide,
N-allyl para-(4-vinyl-1-methyl-n-butyl)-phenyl arcylamide,
N-allyl para-(4-vinyl-1-methyl-n-butyl)-benzamide,
N-(n-hexene-3-yl)hexene-3-amide,
para-isopropenyl-para'-(isopropenyl-amino)-diphenyl,
the allyl amine of para-(6-isopropenyl-1-methyl-n-hexyl) diphenyl,
1-(allyl-amino)-7-isopropenyl-heptane,
1-(isopropenyl-amino)-6-isopropenyl-hexane,
1-(vinyl-amino)-8-vinyl octane,
bis-(4-vinyl-cyclohexyl)-amine,
bis-(4-isopropenyl-cyclohexyl)-amine,
N-(n-hexene-3-yl)-4-allyl-cyclohexyl-formamide,
4-allyl-cyclohexyl-crotonamide,
diallyl-amine,
dimethallyl-amine,
di-hexene-3-yl-amine, etc.

Other examples of polyunsaturated modifiers of the above formulas that can be used in the practice of this invention include: the vinyl ether of ethylene glycol monoacrylate; the allyl ether of trimethylene glycol monomethacrylate; the methallyl ether of tetramethylene glycol monochloracrylate; the chlorallyl ether of pentamethylene glycol monocrotonate; the mono-(beta-methyl-chloracrylate) of the isopropenyl ether of 1,4-dihydroxy-2-phenyl-butane; the alpha-phenyl-allyl ether of the monoacrylate of 2,11-dimethyl-2,11-dihydroxy-dodecane; the monoacrylate monocrotonate of the glyceryl monoether of 7-hydroxy-octene-1; the isopropenyl-ether of the monoacrylate of 2,11-dihydroxy-dodecene-6; the monoether of 2-methylol-1,4-butadiene and the monoethacrylate of 2,11-dihydroxy-6-vinyl-dodecane; the monoether of 2-hydroxy-2-methyl-octadiene-4,7 and the monoacrylate of 2,34-dihydroxy-2,3,34,35-tetrahydrolycopene; the isopropenyl ether of the monochloracrylate of hexamethylene glycol; the mono-(alpha, beta-dimethyl-acrylate) of the 7-hydroxy-octene-1 ether of 1,8-dihydroxy-octane; the monoacrylate of the 3-hydroxy-3-methyl-butene-1 ether of resorcinol; the monomethacrylate of the ether of pentene-1-ol-5 and dihydroxynaphthalene; the monomethacrylate of the ether of 2,5-dimethyl-5-hydroxy-hexene-1 and dihydroxy-methyl-diphenyl; the monoacrylate of the ether of 17-hydroxy-octadecene-1 and dihydroxy-acetoxy-naphthalene; the monocrotonate of the ether of 5-acetoxy-7-hydroxy-octene-1 and di-(beta-ethylol)-benzene; the monoacrylate of the ether of 5-phenoxy-7-hydroxy-octene-1 and benzoxy resorcinol; the monoacrylate of the vinyl ether of beta-ethylol phenol; the monomethacrylate of the allyl ether of ethoxy resorcinol; the monoacrylate of the isopropenyl ether of phenoxy-hydroquinone; the monoacrylate of the isopropenyl ether of beta-phenylethoxy-hydroquinone; the monomethacrylate of the isopropenyl ether of 1,8-dihydroxy-4-acetoxy-dodecane; the monoacrylate of the vinyl ether of (ethylphenoxy)-dihydroxy-naphthalene; the monoacrylate of the diisopropenyl ether of trihydroxy-naphtalene; the monoacrylate, monochloracrylate of the allylether of 2,5,7-trihydroxy-octane, etc.

Such modifiers also include;

vinyl beta-acryloxy-butyrate;
methallyl epsilon-methacryloxy-caproate;
isopropenyl omega-chloracryloxy-dodecanoate;
vinyl beta-acryloxy-propionate;
allyl 11-crotonoxy-hexadecanoate;
a-phenyl-allyl omega-acryloxy decanoate;
(1-methyl-5-vinyl-n-pentyl)-p-acryloxy-benzoate;
(alpha, alpha-dimethyl-allyl) (beta-methyl-chloracryloxy)-ethoxy-benzoate;
(3-vinyl-n-propyl) p-acryloxyphenyl-acetate;
(1,1-dimethyl-3-isopropenyl-propyl-acryloxy-methoxy-benzoate;
(1-methyl-15-vinyl-n-pentadecyl) 2-acryloxy-2-phenyl-propionate;
(1-methyl-3-acetoxy-5-vinyl-n-pentyl) (alpha,beta-dimethyl-acryloxy)-naphthoate;
(1-methyl-3-phenoxy-5-vinyl-n-pentyl) (acryloxy-methoxy)-naphthoate;
isopropenyl 12-acryloxy-octaden-9-oate;
allyl-16-methacryloxy-hexadecen-7-oate;
2-methyl-octadiene-4,7-yl-2-chloracryloxy-(acetoxy-naphthoate);
methallyl-5-methacryloxy-8-benzoxy-monoate;
chlorallyl crotonoxy-ethyl-naphthoate;
allyl methacryloxy-octoxy-benzoate;
a-phenyl-allyl-5-crotonoxy-nonoate;
vinyl-bis-(acryloxy-phenyl)benzoate;
chlorallyl (acryloxy-phenoxy-ethyl)-benzoate;
vinyl-3-arcyloxy-5-chloracryloxy-palmitate;
vinyl beta-vinyloxy propionate;
vinyl beta-allyloxy propionate;
vinyl beta-methallyloxy-butyroate;
allyl epsilon-allyloxy-caproate;
chlorallyl omega-isopropenyloxy-n-hexadecanoate;
alpha-phenyl-allyl 11-(1-methyl-5-vinyl-n-pentyloxy)n-hexadecanoate;
1-methyl-5-vinyl-pentyl omega-(1-methyl-5-vinyl-n-pentyloxy)n-decanoate;
alpha,alpha-dimethyl allyl (alpha-phenyl-allyloxy)-benzoate;
3-vinyl-n-propyl (3-vinyl-n-propyloxy-beta-ethoxy)-benzoate;
vinyl (1,3-dimethyl-3-isopropenyl-n-propoxy-phenyl)-acetate;
1-methyl-15-vinyl-n-pentadecyl alpha-phenyl-beta-(1-methyl-3-acetoxy-5-vinyl-pentyloxy)propionate;
isopropenyl (1-methyl-3-phenoxy-5-vinyl-pentyloxy)-naphthoate;
(1-methyl-n-heptadecyl) (vinyloxy-methyl-naphthoate;
isopropenyl acetoxy-(1-methyl-5-vinyl-pentyloxy)-naphthoate;
(3-vinyl-n-propyl)ethyl-(1,2-dimethyl-allyloxy)-naphthoate;
methallyl octoxy-(allyloxy)-benzoate;
alpha-phenyl-allyl-5-vinyloxy-8-benzoxy-n-monoate;
methallyl bis(vinyloxyphenyl)-benzoate;
vinyl ethyl-(vinyloxyphenyl)-benzoate;
vinyl 3,5-diallyloxy-palmitate;
vinyl beta, beta-bis-acryloxy-propionate;
divinyl acryloxy-succinate;
1-methyl-4,6-diallyloxy-heptyl acrylate;
vinyl bis-(isopropenyl-oxy-phenyl)-benzoate;
diallyl (beta-allyloxy-ethyl)-terephtalate, etc.

Other suitable polyunsaturated modifiers include:
vinyl-phenyl acrylate,
vinyl-phenyl methacrylate,
vinyl-phenyl chloracrylate,
vinyl-phenyl crotonate,
isopropenyl-phenyl acrylate,
isopropenyl-phenyl methacrylate,
isopropenyl-phenyl chloracrylate,
isopropenyl-phenyl crotonate,
allyl-phenyl acrylate,
allyl-phenyl methacrylate,
allyl-phenyl chloracrylate,
allyl-phenyl crotonate,
allyl para-(4-vinyl-1-methyl-n-butyl)-phenyl-acrylate,
allyl para-(4-vinyl-1-methyl-n-butyl)-benzoate,
the allyl ether of para-(6-isopropenyl-1-methyl-n-hexyl)-phenol 2-vinyl-5-acryloxy-naphthalene,
2-isopropenyl-5-acryloxy-naphthalene,
1 vinyl-5-methacryloxy-naphthalene,
2-isopropenyl-5-chloracryloxy-naphthalene,
2-allyl-5-methacryloxy-naphthalene,
1-acryloxy-6-(4-vinyl-1-methyl-n-butyl)-naphthalene,
para-vinyl-para'-acryloxy-diphenyl,
para-isopropenyl-para'-methacryloxy-diphenyl,
para-allyl-para'-chloracryloxy-diphenyl,
the allyl ester of 5-(4-vinyl-1-methyl-n-butyl)-naphthoic acid,
the allyl ester of para-(6-isopropenyl-1-methyl-n-hexyl)-diphenyl-carboxylic acid,
6-isopropenyl-1-methyl-hexylacrylate,
8-vinyl-1-methyl-n-octylmethacrylate,
the isopropenyl ester of 6-vinyl-heptanoic acid,
the methallyl ester of 6-vinyl-octanoic acid,
the vinyl ester of 7-vinyl nonanoic acid,
the allyl ether of 7-isopropenyl-heptanol-1,
the isopropenyl ether of 6-isopropenyl-hexanol-1,
the vinyl ether of 8-vinyl-octanol-1,
1,8 diisopropenyl-n-octane,
1,6-diisopropenyl-n-hexane, etc.

The amount of polyunsaturated modifier to be added will vary depending on the properties of the base material to which it is added. For example, high molecular weight base materials would require less modifier to bring them to an infusible state, whereas a base material of lower molecular weight would require larger amounts of polyunsaturated modifier. Although even as little as 0.1 percent of polyunsaturated compounds often effects notable changes in the properties of the base material, it is generally advantageous to have at least 1 percent or more of such modifier present. The upper limit in the amount of such modifiers is determined by various factors, such as the effect on the B.t.u. value of the resultant product, etc. While even higher percentages of modifier, based on weight of the base material, might be desired in some cases where a softening effect is desired and where the effect on the B.t.u. value is not adverse or is permissible, as much as 50 percent, based on weight of base material, can be present. However, for practical and economical reasons, it is generally advantageous to add only sufficient modifier to effect infusibility in the base material or to effect such softening as may be desired.

While the desired amount of irradiation is not much more than the amount required to produce crosslinking or infusibility in the material being exposed, it is obviously desirable to avoid exposures of such great amount as to cause degradation or decomposition to such a degree that the product cannot be used for the purposes of this invention. While the upper limit will vary according to the material being treated, many of the base materials can safely be exposed at 100 megareps or more, while exposure of more sensitive materials should be below 80 megareps.

Other shapes and other uses of the fuel than those indicated above are contemplated. For example, solid rods or solid cylinders can be used with combustion being conducted on the outer surfaces. Particularly with the amount of oxidizing agent permitting more easily controlled combustion, the fuel can be used in jet planes and for many other purposes.

While certain features of this invention have been described in detail with respect to various embodiments thereof, it will, of course, be apparent that other modifications can be made within the spirit and scope of this invention and it is not intended to limit the invention to the exact details shown above, except insofar as they are defined in the following claims:

The invention claimed is:

1. A propellant grain consisting essentially of an irradiated crosslinked mass consisting essentially of a rubber selected from the class consisting of natural rubber and synthetic rubber polymers and copolymers of 1,3-dienes and 1–95 percent by weight of an oxidizing agent selected from the class consisting of potassium perchlorate, potassium nitrate, potassium permanganate, potassium iodate, potassium dichromate, ammonium perchlorate, ammonium nitrate, ammonium persulfate, manganese dioxide, perchloric acid, chloric acid, and aryl perchloryl compounds, said grain having a tubular shape with substantially uniform cross-section throughout its length, and said rubber-oxidizing agent mass having been exposed to at least two megareps and no more than about 100 megareps of high-energy, ionizing radiation derived from an energy source equivalent to at least 100,000 electron volts.

2. A propellant grain consisting essentially of an irradiated, crosslinked mass consisting essentially of a rubber selected from the class consisting of natural rubber and synthetic rubber polymers and copolymers of 1,3-dienes and 1–95 percent by weight of an oxidizing agent selected from the class consisting of potassium perchlorate, potassium nitrate, potassium permanganate, potassium iodate, potassium dichromate, ammonium perchlorate, ammonium nitrate, ammonium persulfate, manganese dioxide, perchloric acid, chloric acid, and aryl perchloryl compounds, said grain having an elongated shape with at least one opening extending linearly through said grain, and said polymeric oxygenated hydrocarbon having been exposed to at least two megareps and no more than about 100 megareps of high-energy, ionizing radiation derived from an energy source equivalent to at least 100,000 electron volts.

3. A propellant grain of claim 2, in which said rubber contains 0.1–50 percent by weight of a crosslinking modifier having a plurality of unsaturated groups therein selected from the class consisting of ethylenic and acetylenic groups and having no elements therein other than selected from the class consisting of carbon, hydrogen, oxygen, nitrogen, chlorine, and fluorine, said oxygen being present only in the form of a group selected from the class consisting of ether, acetal, carboxylic ester, carboxylic acid, hydroxyl and amide groups, and said nitrogen being present only in the form of a group selected from the class consisting of amide, amine, and cyano groups.

4. A propellant grain of claim 3, in which said rubber is natural rubber.

5. A propellant grain of claim 3, in which said rubber is a synthetic rubber copolymer of a 1,3-diene compound.

6. A propellant grain of claim 3, in which said rubber is a synthetic rubber copolymer of a 1,3-diene hydrocarbon.

7. A propellant grain of claim 3, in which said rubber is a synthetic rubber copolymer of 1,3-butadiene and styrene.

8. A propellant grain of claim 1, containing 0.1–50 percent of a crosslinking modifier having a plurality of unsaturated groups therein selected from the class consisting of ethylenic and acetylenic groups having no elements therein other than selected from the class consisting of carbon, hydrogen, oxygen, nitrogen, chlorine and fluorine, said oxygen being present only in the form of a group selected from the class consisting of ether, acetal, carboxylic ester, carboxylic acid, hydroxyl and amide groups, and said nitrogen being present only in the form of a group selected from the class consisting of amide, amine and cyano groups.

9. A propellant grain of claim 8 containing at least one percent of said crosslinking modifier.

10. A propellant grain of claim 9 in which said oxidizer is ammonium perchlorate.

11. A propellant grain of claim 9, in which said oxidizer is potassium perchlorate.

12. A propellant grain of claim 9, in which said crosslinking modifier is a polyunsaturated hydrocarbon.

13. A propellant grain of claim 9, in which said crosslinking modifier is a polyalkenyl aryl hydrocarbon.

14. A propellant grain of claim 9, in which said crosslinking modifier is a divinyl aryl hydrocarbon.

15. A propellant grain of claim 9, in which said crosslinking modifier is divinyl benzene.

16. A propellant grain of claim 9, in which said crosslinking modifier is divinyl benzene and said oxidizer is potassium perchlorate.

17. A process of preparing a propellant grain comprising the steps of shaping a mass consisting essentially of a rubber selected from the class consisting of natural rubber and synthetic rubber polymers and copolymers of 1,3-diene compounds, and 1–95 percent by weight of an oxidizing agent selected from the class consisting of potassium perchlorate, potassium nitrate, potassium permanganate, potassium iodate, potassium dichromate, ammonium perchlorate, ammonium nitrate, ammonium persulfate, manganese dioxide, perchloric acid, chloric acid and aryl perchloryl compounds, into a shape in which said grain ultimately is to be used and thereafter exposing said shaped mass to at least two megareps and not more than about 100 megareps of high-energy, ionizing radiation derived from an energy source equivalent to at least 100,000 electron volts.

18. A process of claim 17, in which said mass contains 0.1–50 percent by weight of a crosslinking modifier having a plurality of unsaturated groups therein selected from the class consisting of ethylenic and acetylenic groups, and having no elements therein other than selected from the class consisting of carbon, hydrogen, oxygen, nitrogen, chlorine and fluorine, said oxygen being present only in the form of a group selected from the class consisting of ether, acetal, carboxylic ester, carboxylic acid, hydroxyl and amide groups, and said nitrogen being present only in the form of a group selected from the class consisting of amide, amine and cyano groups.

19. A process of claim 18, in which said rubber is a copolymer of 1,3-butadiene and styrene.

20. A process of propelling rockets comprising the step of combusting an irradiated crosslinked mass consisting essentially of a rubber selected from the class consisting of natural rubber, and synthetic rubber polymers and copolymers of 1,3-diene compounds, and 1–95 percent by weight of an oxidizing agent selected from the class consisting of potassium perchlorate, potassium nitrate, potassium permanganate, potassium iodate, potassium dichromate, ammonium perchlorate, ammonium nitrate, ammonium persulfate, manganese dioxide, perchloric acid, chloric acid and aryl perchloryl compounds, said mass being contained in the fuel chamber of a rocket and having a tubular shape having substantially uniform cross-section throughout its length, said tubular shape being adapted to permit escape of combustion products from only one end of the linear opening therein, and said mass having been exposed to at least two megareps and no more than about 100 megareps of high energy, ionizing radiation derived from an energy source equivalent to at least 100,000 electron volts.

21. A process of propelling rockets comprising the step of combusting an irradiated crosslinked mass consisting essentially of a rubber selected from the class consisting of natural rubber and synthetic rubber polymers and copolymers of 1,3-diene compounds, and 1–95 percent by weight of an oxidizing agent selected from the class consisting of potassium perchlorate, potassium nitrate, potassium permanganate, potassium iodate, potassium dichromate, ammonium perchlorate, ammonium nitrate, ammonium persulfate, manganese dioxide, perchloric acid, chloric acid, and aryl perchloryl compounds, said mass being contained in the fuel chamber of a rocket and having an elongated shape with at least one opening extending linearly through said mass, said elongated shape being adapted to permit escape of combustion products from only one end of said linear openings, and said mass having been exposed to at least two megareps and no more than about 100 megareps of high energy, ionizing radiation derived from an energy source equivalent to at least 100,000 electron volts.

22. A process of claim 21, in which said mass contains at least 0.1 percent by weight of a crosslinking modifier having a plurality of unsaturated groups therein selected from the class consisting of ethylenic and acetylenic groups, and having no elements therein other than selected from the class consisting of carbon, hydrogen, oxygen, nitrogen, chlorine and fluorine, said oxygen being present only in the form of a group selected from the class consisting of ether, acetal, carboxylic ester, carboxylic acid, hydroxyl, and amide groups, and said nitrogen being present only in the form of a group selected from the class consisting of amide, amine, and cyano groups.

23. A process of claim 22 in which said rubber is a synthetic rubber copolymer of 1,3-butadiene.

References Cited in the file of this patent

UNITED STATES PATENTS

| | | |
|---|---|---|
| 1,906,402 | Newton | May 2, 1933 |
| 2,763,609 | Lewis et al. | Sept. 18, 1956 |
| 2,791,883 | Moore et al. | May 14, 1957 |
| 2,877,504 | Fox | Mar. 17, 1959 |

FOREIGN PATENTS

| | | |
|---|---|---|
| 665,262 | Great Britain | Jan. 23, 1952 |
| 732,047 | Great Britain | June 15, 1955 |
| 742,933 | Great Britain | Jan. 4, 1956 |

OTHER REFERENCES

Sun: Modern Plastics, September 1954, pp. 141–4, 146, 148, 150, 229–33 and 236–8.

Arendale: Ind. and Eng. Chem., vol. 48, No. 4, April 1956, pp. 725–6.

Blatz: Ind. and Eng. Chem., vol. 48, No. 4, April 1956, pp. 727–9.

Buchanan et al.: Ind. and Eng. Chem., vol. 48, No. 4, April 1956, pp. 730–1.

Moore et al.: Jet Propulsion, vol. 26, No. 11, November 1956, pp. 965–8.

Atomics: November 1956, vol. 7, No. 11, pp. 397–8.

Symposium on "Utilization of Radiation from Fission Products," Harwell, A.E.R.E, C/R 1231 pp. 24, 25, 64–66 and 111–124.